(No Model.)

T. AKINS.
EDGE TRIMMER FOR WALKS AND BEDS.

No. 339,359. Patented Apr. 6, 1886.

WITNESSES:
Chas. Nida
C. Sedgwick

INVENTOR:
T. Akins
BY Munn & Co
ATTORNEYS.

UNITED STATES PATENT OFFICE.

THOMAS AKINS, OF CAMDEN, NEW JERSEY.

EDGE-TRIMMER FOR WALKS AND BEDS.

SPECIFICATION forming part of Letters Patent No. 339,359, dated April 6, 1886.

Application filed January 15, 1886. Serial No. 188,701. (No model.)

*To all whom it may concern:*

Be it known that I, THOMAS AKINS, of Camden, in the county of Camden and State of New Jersey, have invented a new and useful Improvement in Edge-Trimmers for Walks and Beds in Gardens, Lawns, and Parks, of which the following is a full, clear, and exact description.

Reference is to be had to the accompanying drawings, forming a part of this specification, in which similar letters of reference indicate corresponding parts in all the figures.

Figure 1:
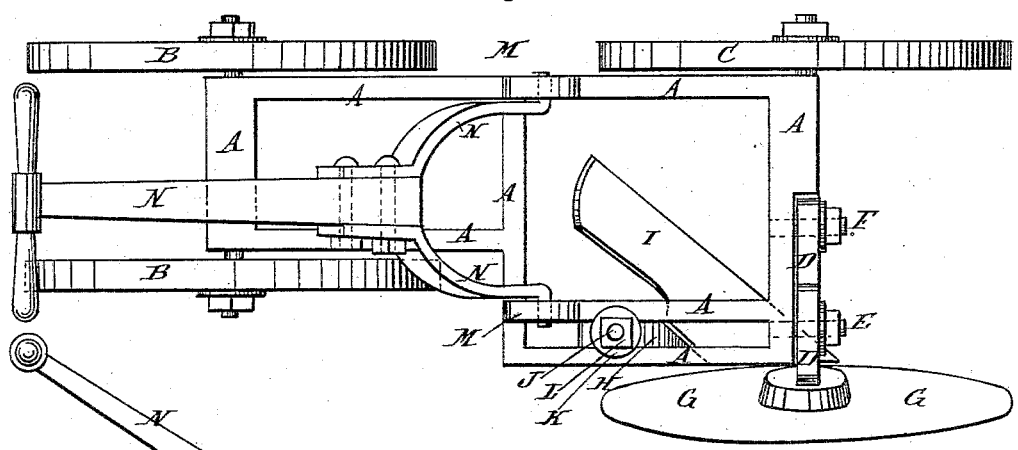
Figure 2:
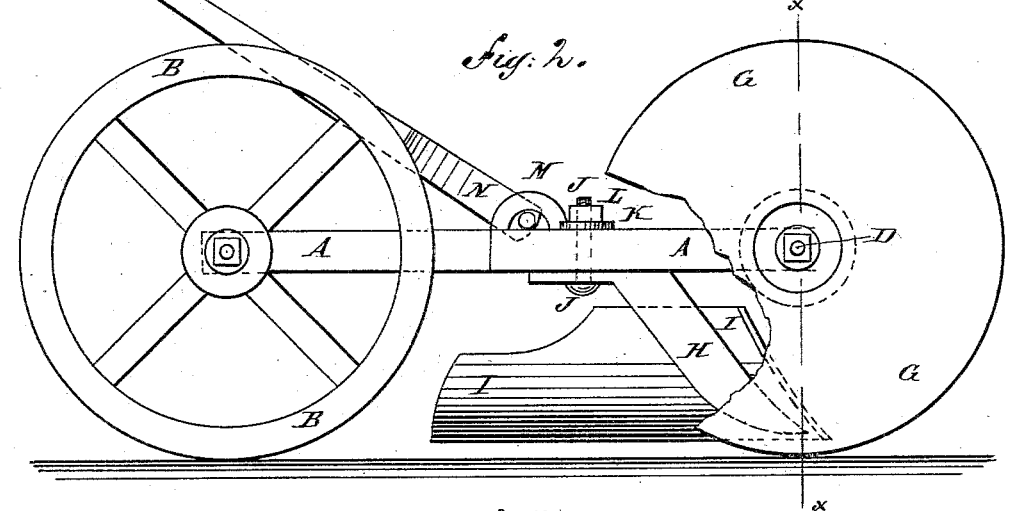
Figure 3:
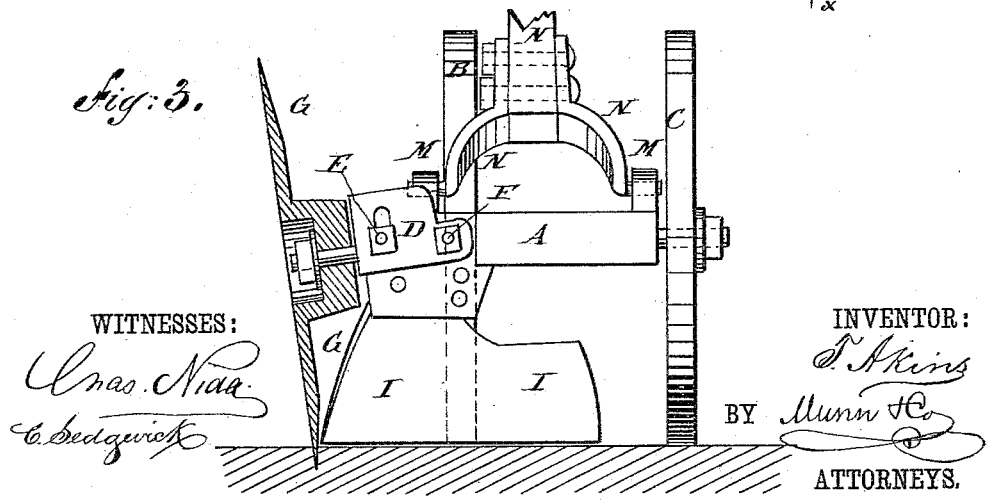

Figure 1 is a plan view of my improved machine. Fig. 2 is a side elevation of the same, part being broken away. Fig. 3 is a front elevation of the same, partly in section, through the line *x x*, Fig. 2, and part being broken away.

The object of this invention is to provide edge-trimmers for walks and beds in gardens, lawns, and parks, constructed in such a manner that they can be readily adjusted to cut the edges vertical or at any desired slope.

The invention consists in the construction and combination of the various parts of the edge-trimmer, as will be hereinafter fully described.

A represents the frame of the machine, the rear part of which is rabbeted on the off side to bring the off drive-wheel within the line of the off side of the forward part of the said frame, as shown in Fig. 1.

Upon the rear corners of the frame A are formed, or to them are attached, journals upon which revolve the rear wheels, B. Upon the near forward corner of the frame A is formed, or to it is attached, a journal upon which revolves the forward wheel, C. The off part of the frame A is rabbeted on front cross-bar of the frame A is rabbeted on its forward side, and is extended downward to form a seat for the widened inner part of the axle D, which is secured in place by the bolts E F. The bolt E passes through a curved slot in the axle D, and through one or another of a series of holes in the outer widened part of the front cross-bar. The bolt F passes through a hole in the inner end of the axle D, and through one or another of a series of holes in the inner widened part of the front cross-bar.

Upon the journal of the axle D is placed the rotary cutter G, the outer end of the hub of which is flush with the outer surface of the said cutter, and is recessed to receive the nut that secured the said cutter on its journal, as shown in Fig. 3, so that there will be no projection upon the outer side of the cutter G to interfere with its working. With this construction, by adjusting the bolts E F the cutter G can be adjusted in a vertical position, or at any desired inclination, as the shape to be given to the edge of the walk or bed may require. The off side bar of the forward part of the frame A is slotted longitudinally to receive the upper end of the plow-standard H, to the lower end of which is secured the plow I, and which is secured to the said side bar by a bolt, J, a washer, K, and a nut, L, as shown in Figs. 1 and 2, so that by loosening the nut L of the bolt J the standard H can be adjusted to bring the forward end of the plow I close to the cutter G, however the said cutter may be adjusted. With this construction, as the machine is moved along the edge of a walk the cutter G trims the edge of the sod to the desired slope, and the plow or scraper loosens the sod and soil cut off and throws them into the middle part of the walk, whence they can be readily removed.

When the machine is to be used for trimming the edges of beds, the plow H I should be detached.

To the side bars of the forward part of the frame A, at or near their rear ends, are attached, or upon them are formed, bearings M, to receive journals formed upon the forked end of the handle N, by means of which the machine is pushed or drawn.

I am aware that sulky-plows have been provided with adjustable axles and with rolling colters, which are adjustable to vary the angle, and I do not claim such, broadly, as of my invention.

Having thus fully described my invention, I claim as new and desire to secure by Letters Patent—

1. In an edge-trimmer, the combination, with the frame A, rabbeted upon the off side of its rear part, supported by three wheels, B B C, and having its front cross-bar rabbeted, widened, and perforated, of the widened, perforated, and slotted axle D, the fastening-bolts E F, and the rotary cutter G, substantially as herein shown and described, whereby the said cutter can be readily adjusted in a vertical or an inclined position, as set forth.

2. In an edge-trimmer, the combination, with the frame A, having slotted side bar and mounted upon three wheels, B B C, the adjustable axle D, and the rotary cutter G, of the plow-standard H, the plow-plate I, and an adjustable fastening, substantially as herein shown and described, whereby the sod and soil cut off by the said cutter will be loosened and moved to the middle part of the walk, as set forth.

3. In an edge-trimmer, the combination, with the frame A, mounted upon three wheels, B B C, and provided with bearings M, the adjustable axle D, the rotary cutter G, attached to the said axle, and the adjustable plow H I, of the handle N, forked at its inner end, substantially as herein shown and described, whereby the machine can be readily propelled, as set forth.

THOMAS AKINS.

Witnesses:
WM. W. D. LEWIS,
HENRY E. COLLINS.